F. BRETTSCHNEIDER.
MANUFACTURE OF BRICKS.
APPLICATION FILED MAR. 26, 1920.

1,395,173.

Patented Oct. 25, 1921.

INVENTOR
FRIEDRICH BRETTSCHNEIDER
BY
ATTORNEYS.

F. BRETTSCHNEIDER.
MANUFACTURE OF BRICKS.
APPLICATION FILED MAR. 26, 1920.
1,395,173.
Patented Oct. 25, 1921.
3 SHEETS—SHEET 2.
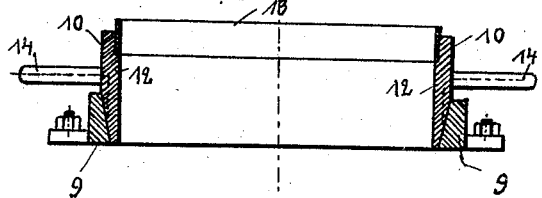
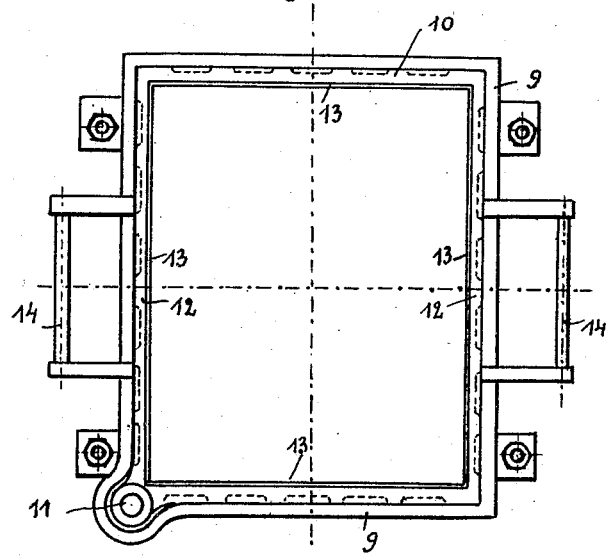
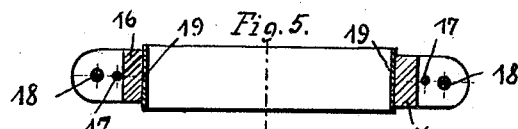
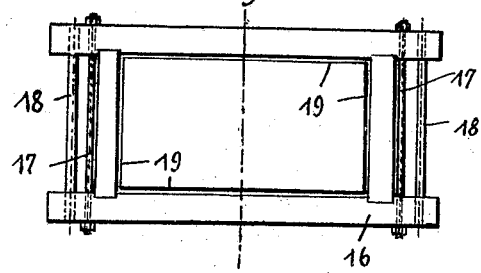
INVENTOR
FRIEDRICH BRETTSCHNEIDER
BY
ATTORNEYS.

F. BRETTSCHNEIDER.
MANUFACTURE OF BRICKS.
APPLICATION FILED MAR. 26, 1920.
1,395,173.
Patented Oct. 25, 1921.
3 SHEETS—SHEET 3.
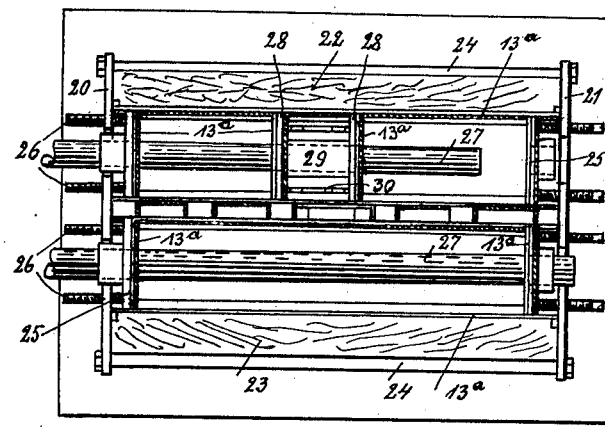
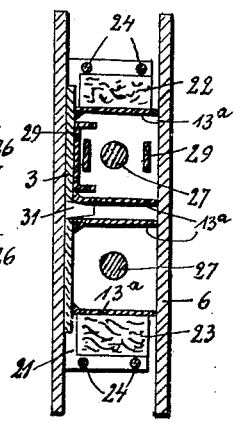
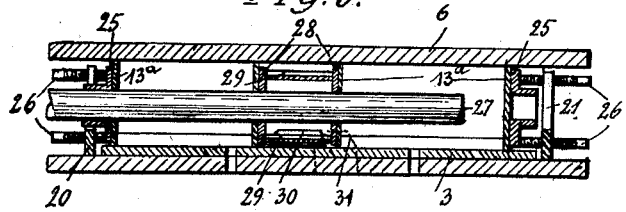
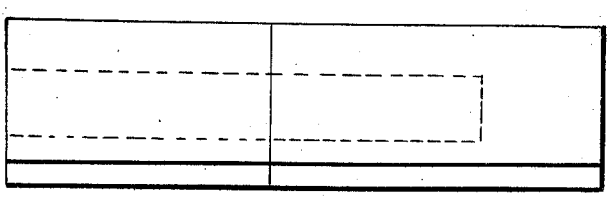
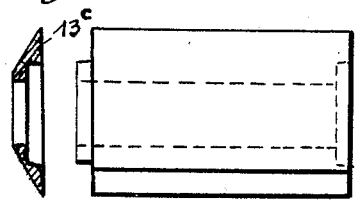
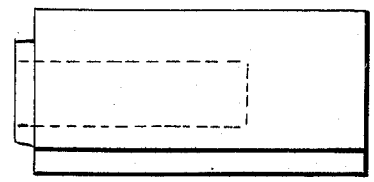
INVENTOR
FRIEDRICH BRETTSCHNEIDER
BY
ATTORNEYS.

UNITED STATES PATENT OFFICE.

FRIEDRICH BRETTSCHNEIDER, OF RAITZ, MORAVIA.

MANUFACTURE OF BRICKS.

1,395,173.  Specification of Letters Patent.  Patented Oct. 25, 1921.

Application filed March 26, 1920. Serial No. 368,989.

*To all whom it may concern:*

Be it known that I, FRIEDRICH BRETT-SCHNEIDER, a citizen of the Czecho-Slovak Republic, residing at Raitz, Moravia, have invented certain new and useful Improvements in the Manufacture of Bricks, of which the following is a specification.

My invention refers to the manufacture of bricks and its particular object is a process and the necessary molds for molding solid or hollow bricks from plastic material, especially chamotte.

According to the invention, the process in which the excess of the charge of the mold is allowed to escape through apertures in a well known manner substantially consists therein that the mass is pressed into a mold by two plates projecting beyond the mold-frame and moved against each other until the mold is filled up, while the excess-charge between the mold frame and the plate escapes and is cut off, the pressure being maintained, until the rest of the excess-charge resulting from the elasticity of the mass has escaped through apertures in one of the plates.

The twofold removal of the excess charge entails the advantage, that the charge pressed into the mold is subject in itself to very little tension, as the greater part of the excess-charge is cut off by the edges of the mold-frame. The tension still existing in the bricks as they are being formed is neutralized by the fact that the excess-charge still remaining can be made to escape through apertures of the mold-wall, so that they are quite free from tension. The novel process therefore renders it possible to produce bricks of perfectly uniform shape and dimensions with level surfaces exactly corresponding to the mold, the possibility of a subsequent expansion of the material or distortion of the surfaces after removal of the brick from the press is eliminated.

The mold for carrying out the process described has its walls provided on one or both sides with cutting frames whose sharpened edges project from the mold. By means of the upper edges, the upper portion of the excess-charge is cut off, while the lower edges cut off the bottom portion. If hollow or tubular bricks are to be produced such as are employed in steel-foundries, the mold-frames are provided with adjustable walls possessing apertures, through which the cores are made to pass.

In the drawings accompanying this specification and forming part thereof the preferred form of a press and the molds according to the present invention are illustrated.

Fig. 3 is a cross-section of a mold, and

Fig. 4 is a plan.

Fig. 5 is a section of a modified mold and

Fig. 6 is a corresponding plan.

Figs. 7 to 13 illustrate a mold for manufacturing hollow or tubular bricks as well as the bricks themselves.

Figure 1:
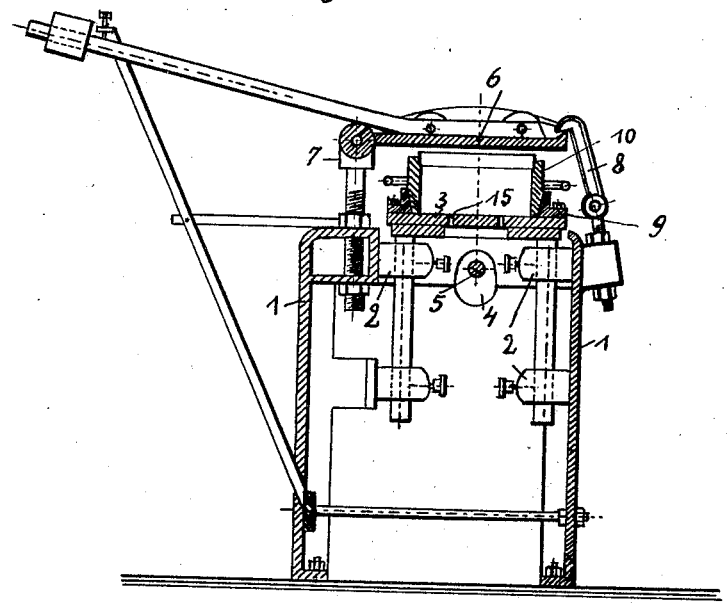
Figure 1 is a longitudinal section.
Figure 2:
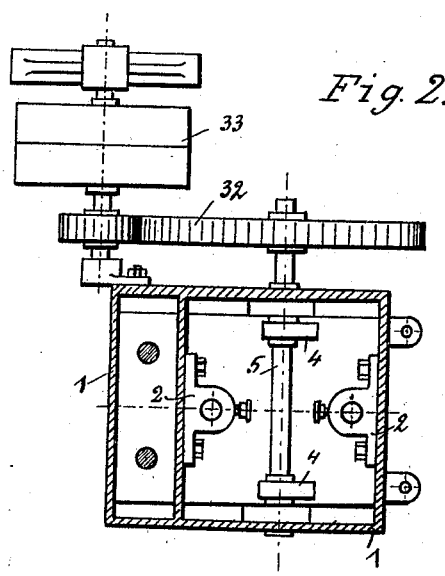
Fig. 2 is a horizontal section of the press.

Fig. 7 being a plan,

Fig. 8 a cross-section and

Fig. 9 a longitudinal section of the mold.

Fig. 10 is a cross-section of an end plate for forming hollow smooth-ended bricks and Fig. 11 are the bricks manufactured with its aid.

Fig. 12 is a cross-section of an end plate for producing hollow bricks with groove and tongue and Fig. 13 illustrates the bricks themselves.

Referring to the drawings, 1 is a structure carrying a plate 3 provided with apertures 15 in bearings 2, said plate being adapted to be lifted and lowered by a flattened eccentric 4 fixed on a shaft 5 driven by means of gear-wheels 32 and pulley 33.

Opposite the plate 3 a second plate 6 provided with hinges 7 is movably attached, said plate being held in position when lowered by hooks 8. The hooks 8, as well as the hinges 7 are adjustably attached, so as to render it possible to adjust the plate 6 on different levels, in accordance with the thickness of the mold, in parallel to plate 3.

Plate 3 carries a frame 9 with sloping inner walls serving for the reception of the mold-frame 10. The mold-frames are preferably shaped as shown in Figs. 3 and 4, but any other form of bricks may be produced, which only requires a corresponding alteration of the mold. In accordance with Figs. 3 and 4 the mold consists of the halves 12 movable about hinges 11 by means of handles 14 and carrying a steel-band 13 at their upper edges.

The outside of mold 10 is cone-shaped to correspond with frame 9 and is provided with indentures facilitating the lifting of the mold.

The mold according to Figs. 5 and 6 consists of the frame 16 held together by screws 17 and provided with handles 18 for the purpose of conveniently handling it. The inner faces of the mold are formed of steel-plates 19 projecting beyond the wooden frame at either side by 4 to 5 milimeters, the upper edges serving to cut off the excess charge as illustrated by Figs. 3 and 4, while the lower edges cut off the rest of the material left on the bottom plate 3.

The mold shown in Figs. 5 and 6 may be turned upside-down so as to make use of the lower cutting-edges, when the upper ones have been worn out.

In place of a single mold a double mold may be employed for producing the double number of bricks, by subdividing the mold into a plurality of chambers through the insertion of single or double steel-plates.

The operation of the devices described is the following: One of the mold-frames 10 or 16 is inserted in the frame 9 of plate 3 and, the plate 6 being raised, a predetermined quantity of material is placed in the mold, this quantity exceeding by about one per cent. the quantity required for the brick. Plate 6 is then lowered and held in position by the hooks 8. The eccentrics 4 thereupon lift plate 3 and with it the mold-frame against plate 6, whereby the excess-charge is pressed out between the plate 6 and the steel-bands 13 are forced with their sharpened edges firmly against the plate 6, thereby cutting off the excess-charge. The flattened form of the excenter causes a uniform pressure to be maintained during a certain time.

As the plastic material is compressed, the mass would expand after the pressure has been taken off and the bricks taken out. In order to prevent this, small apertures 15 are provided in the bottom plate 3, through which that part of the material can escape, which cannot pass through between the plate 6 and the steel-band 13. By suitably dimensioning the apertures 15 in accordance with the mixture of the charge a faultless brick of exact and uniform shape is produced.

The mold for producing hollow or tubular bricks in accordance with Figs. 8 and 10 consists of two front-plates 20 and 21 which, together with the wooden ledges 22 and 23 form the outer frame. Within the frame steel-plates 13ᵃ are arranged, said plates projecting beyond the edges of the frame, the projecting edges being sharpened. These steel-plates form two longitudinal chambers which can be closed by means of front-plates 25 inserted at either end and adapted to be locked in different positions by aid of adjusting screws 26. They are also provided with steel-plates having sharpened edges for cutting off the excess material.

The walls 25 are provided with holes and flanges for the reception of cores 27. The chambers of the mold may also be subdivided by partitions preferably consisting of plates 28 kept at a predetermined distance from each other by means of cross-pieces 29 which serve at the same time as handles. The plates 28 are also provided with holes for the passage of the cores 27 and with projecting steel-plates 13ᵃ. In order to provide that the single parts are always inserted in the same place, the bottom-plate 3 has a projection 30 of conical shape facilitating their adjusting. A second projection 31 catching between the partitions or steel-plates 13ᵃ facilitates the mounting of the mold-frame which is secured in position on the bottom plate of the press in a well known manner.

For the purpose of producing smooth-faced hollow bricks the transverse walls are provided with steel-plates 13ᵇ, as shown in Fig. 10. If hollow bricks with groove and tongue are to be produced, steel-plates 13ᶜ as shown in Fig. 12 are employed.

Hollow bricks are produced by using a mold as shown in Fig. 7 and charging the different chambers with material. The press-plate is then lowered and secured and the pressing is proceeded with in the manner described above. Thereupon, the upper press-plate 6 is turned back and the mold is taken off. The bricks are lifted out together with the cores 27 and the latter are pulled out. In the case of bricks with groove and tongue the front-plates are removed with the bricks.

In this manner perfectly uniform bricks are produced which require no finishing by hand whatever. Owing to the fact that a plurality of bricks of different length always belong together, the mold is suitably constructed so as to permit of several bricks of different length and equal section being made simultaneously.

I claim:—

1. The process for making bricks which consists in charging plastic material into a mold-frame closing said frame and applying pressure to cause the excess-charge to escape and to be cut off between the mold-frame and cover plates, the pressure being then maintained until the rest of the excess-charge resulting from the elasticity of the mass has escaped through apertures provided for this purpose.

2. In a mold in combination, a mold frame and cutting edges provided thereon in projecting relation at its opposite edges.

3. In a mold in combination, a mold frame, a steel-band inserted therein and projecting therefrom beyond its edge, and a plunger coöperative therewith and adapted when the two are pressed together to cut off excess charge.

4. In a mold in combination, a mold-frame, front walls movable longitudinally in said frame and cores extending through apertures of said front walls into said frame.

5. In a mold in combination, a mold-frame, front walls movable longitudinally in said frame, cores extending through apertures of said front-walls into said frame and steel-edges inserted in said frame in close proximity to and projecting above said front walls.

6. In a mold in combination, a mold-frame, front walls movable longitudinally in said frame, face-molding plates adjoining said front walls and cores extending through apertures of said front-walls into said frame.

7. In a mold in combination, a mold-frame, front walls movable longitudinally in said frame, partitions adapted to subdivide said frame into a plurality of chambers and cores extending through apertures of said front-walls into said frame.

In testimony whereof I affix my signature.

FRIEDRICH BRETTSCHNEIDER.

Witnesses:
V. MACHADKA,
JOSEF ROHACES.